United States Patent [19]
Clar et al.

[11] Patent Number: 5,297,644
[45] Date of Patent: Mar. 29, 1994

[54] VEHICLE WITH TILTABLE PROPULSION UNITS

[75] Inventors: Georges Clar, Lyon; Olivier Carra, Peyrins; Patrice Feuillet, Marcy L'Etoile, all of France

[73] Assignee: Framatome, Courbevoie, France

[21] Appl. No.: 727,046

[22] Filed: Jul. 9, 1991

[30] Foreign Application Priority Data

Jul. 9, 1990 [FR] France ................. 90 08691

[51] Int. Cl.$^5$ ............................... B62D 55/06
[52] U.S. Cl. ................... 180/9.32; 180/8.7; 180/9.46
[58] Field of Search ......... 180/8.7, 9.32, 9.46, 180/9.64

[56] References Cited

U.S. PATENT DOCUMENTS

| | | | |
|---|---|---|---|
| 1,592,654 | 7/1926 | Bremer | 180/9.32 |
| 3,182,741 | 5/1965 | Roach . | |
| 3,417,832 | 12/1968 | Ziccardi | 180/9.32 |
| 3,447,620 | 6/1969 | Schoonover . | |
| 4,702,331 | 10/1987 | Hagihara et al. | 180/9.32 |
| 4,977,971 | 12/1990 | Crane, III et al. | 180/9.32 X |

FOREIGN PATENT DOCUMENTS

| | | | |
|---|---|---|---|
| 0075069 | 4/1986 | Japan | 180/9.32 |
| 8900512 | 1/1989 | World Int. Prop. O. . | |

OTHER PUBLICATIONS

"Use of Force and Attitude Sensors for Locomotion of a Legged Vehicle Over Irregular Terrain" 8210 International Journal of Robotics Research-vol. 2 (1983) No. 2, Cambridge, Mass., U.S.A.

Primary Examiner—Margaret A. Focarino
Assistant Examiner—C. Mattix
Attorney, Agent, or Firm—Pollock, Vande Sande & Priddy

[57] ABSTRACT

A transverse axis tubular hub (24) couples each propulsion unit (4) to the vehicle body (2), and supplies signals representative of the forces that it transmits. A tilt motor (22) of the propulsion unit bears on the hub to tilt the propulsion units about a transverse axis, on which a drive motor is disposed.

6 Claims, 7 Drawing Sheets

VEHICLE WITH TILTABLE PROPULSION UNITS

FIELD OF THE INVENTION

The present invention concerns a vehicle designed to operate in the absence of a human operator, especially in buildings.

It finds particular application in industrial installations where work needs to be carried out that would be dangerous or impossible for a human operator. It may be provided with appropriate instruments such as video cameras, measuring instruments and tools, thus constituting a robot.

A robot in accordance with the present invention can be especially useful in a nuclear power plant or in a nuclear fuel reprocessing plant when it is necessary to inspect or carry out repairs in areas subject to high levels of ionizing radiation after a malfunction. Robots of this kind can be equally useful in other industries, for example in the chemical industry where there is a risk of explosion, or for security or site surveillance purposes, or in the context of service robots, for example in cleaning, in agriculture or in military operations.

BACKGROUND OF THE INVENTION

An important property of a vehicle of this kind is its ability to travel over rough ground. The obstacles to be surmounted in this case can be of highly diverse forms, for example a staircase designed for humans which the vehicle must travel up or down, or a pipe fallen onto a floor. There are two main aspects to the security of such vehicles when surmounting such obstacles. One is stability, i.e., the ability of the vehicle not to topple over due to its own weight and that of its payload. The other is grip and relates to each of the propulsion units of the vehicle, i.e., the members which rest on the ground to support and displace or immobilize the vehicle. The "grip" of a propulsion unit is its ability not to slip excessively in contact with the ground, even if the surface state of the ground is locally unfavorable.

Another important property of a vehicle of this kind is its compactness: its overall dimensions, especially in the transverse and longitudinal directions, must preferably be sufficiently small for the vehicle to travel through narrow passages or corridors in a building designed only to admit a human operator Another important property is that the vehicle should be as light as possible Various vehicles have been designed to have a good ability to surmount obstacles safely.

A known vehicle has four tracked propulsion units which can tilt relative to the vehicle body. The track on each propulsion unit is guided by a number of guide members, including two sprocket wheels one of which is a drive sprocket wheel for driving the track. These units are carried by a propulsion unit body which is assembled to the vehicle body in such a way as to enable the propulsion unit to tilt about a transverse axis. The vehicle body carries drive and tilt motors for rotating the drive sprocket wheels through mechanical transmission systems and for driving the tilting movements of the propulsion units, respectively. These motors are provided with brakes for controlling these movements. The vehicle body further carries batteries for supplying electrical power and motor control means.

This known vehicle was designed by the Japanese company Mitsubishi and is known as the MRV (Multifunctional Robot Vehicle). It is described on pages 425 and 426 of the report on the "85 ICAR International Conference on Advanced Robotics, Sep. 9-10, 1985, Tokyo, Japan, organized by: Robotics Society of Japan, The Society of Biomechanisms, Japan Industrial Robot Association".

This prior art vehicle appears to be able to surmount obstacles of known shape. However, to enable it to do so, it must be controlled by a human operator who can see the obstacle, even if from a distance. Also, it would not seem to offer other above-mentioned important properties to a sufficient degree.

SUMMARY OF THE INVENTION

An object of the present invention is to provide a simple vehicle able to surmount safely varied obstacles while having a limited transverse overall dimension enabling it to navigate passages designed for persons. It is also directed to enabling the mounting of tools on the vehicle to constitute a robot able to carry out work in various buildings, especially if an accident has rendered the premises inaccessible to a human operator.

To this end, at least one coupling structure which couples a propulsion unit to the vehicle body is used also to supply signals representative of the forces that it is transmitting, at least one motor for tilting the propulsion unit being contained in the propulsion unit and bearing against coupling the structure to tilt the propulsion unit about a transverse axis.

BRIEF DESCRIPTION OF THE DRAWINGS

The manner in which the present invention can be put into effect will now be described with reference to the appended drawings, in which an embodiment of the invention is described by way of example.

DESCRIPTION OF PREFERRED EMBODIMENT

Figure 1:
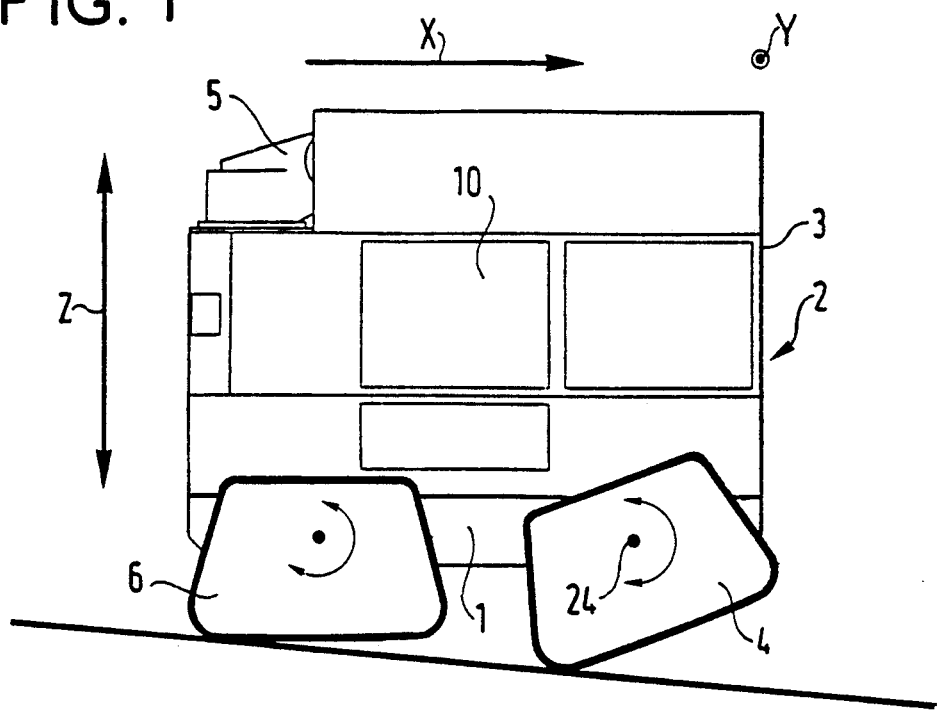
FIG. 1 is a side view of vehicle in accordance with the present invention.
Figure 2:
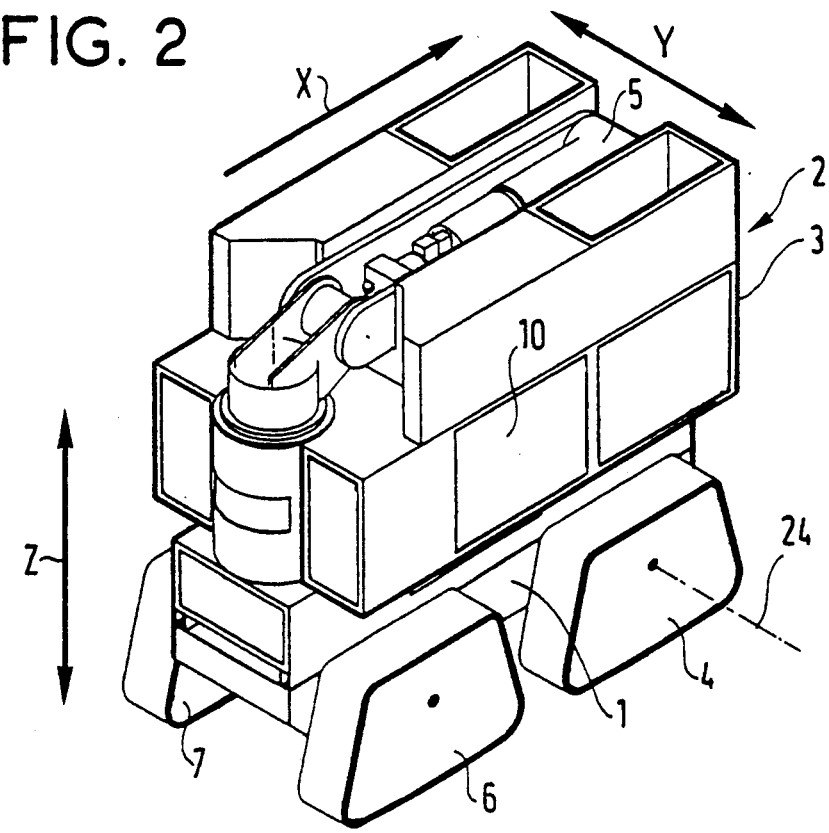
FIG. 2 is a perspective view of the same vehicle.
Figure 3:
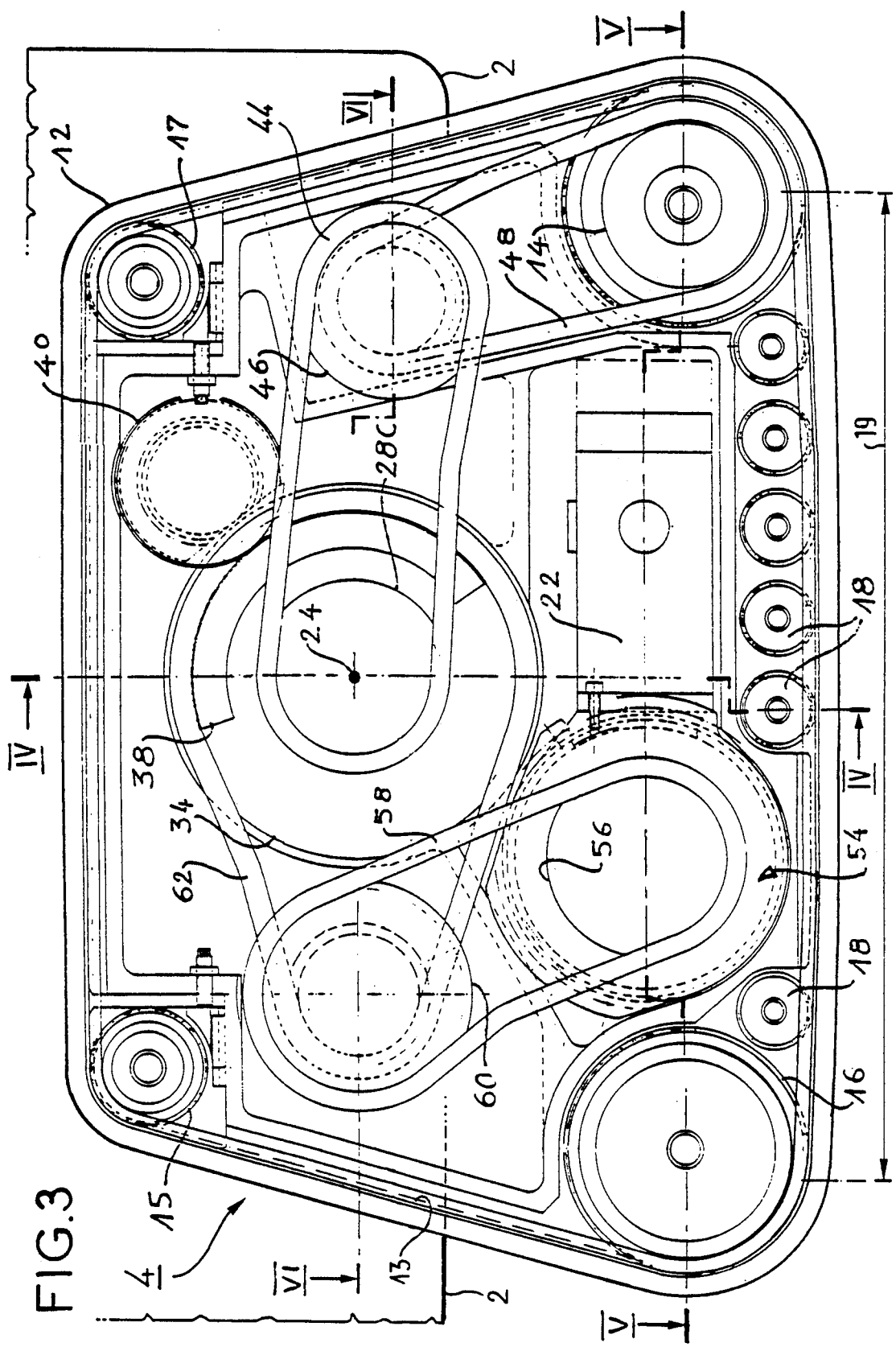
FIG. 3 is a side view of a propulsion unit of the same vehicle, exterior walls of which have been removed to show the internal parts.
Figure 4:
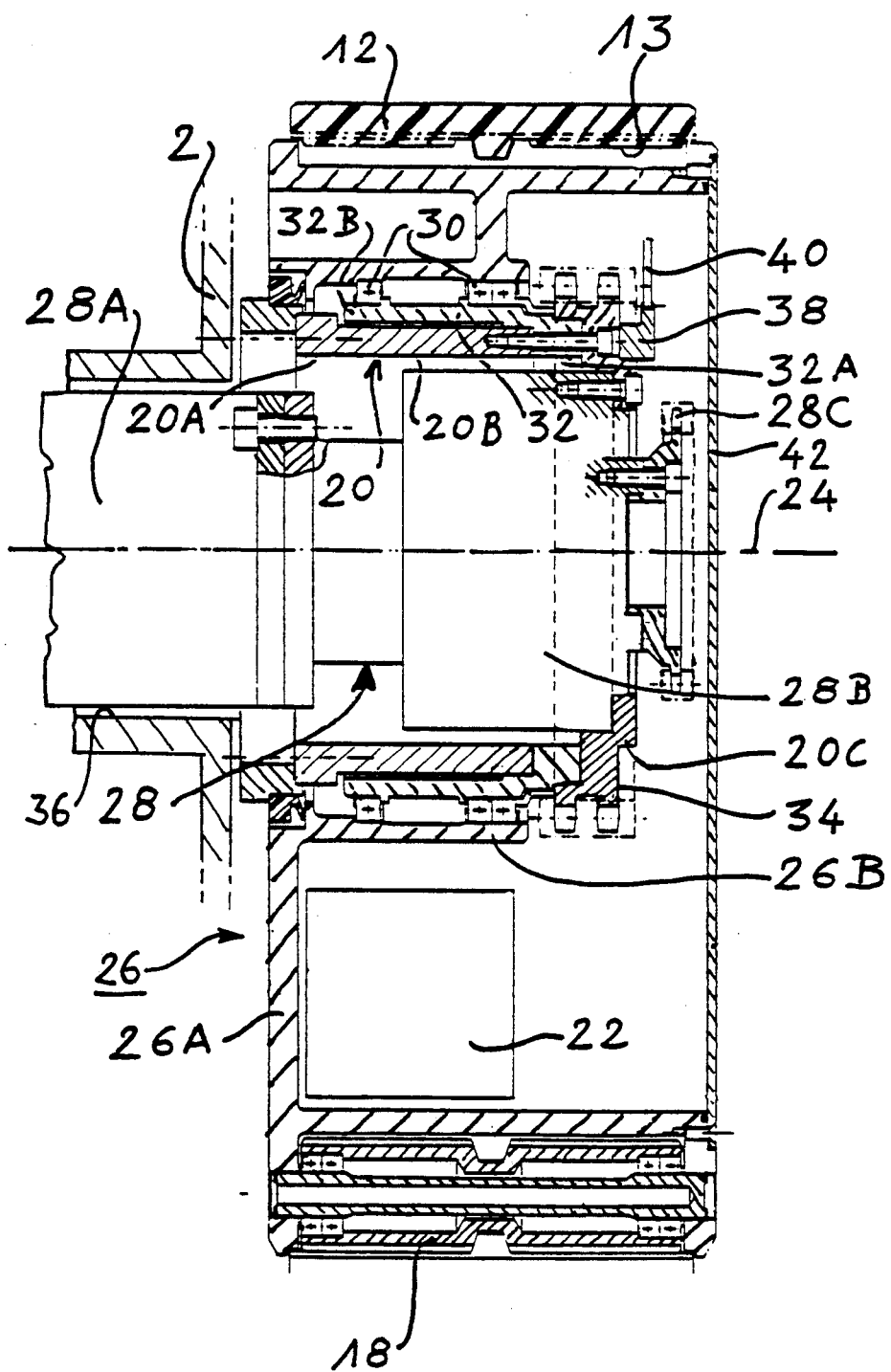
FIGS. 4, 5 and 6 are views of the propulsion unit in cross-section along respective lines IV—IV, V—V and VI—VI in Figure.

As shown in FIGS. 1 and 2, an autonomous guided vehicle in accordance with the present invention includes a vehicle body 2 having a lower part 1 mounted on four tiltable and removable propulsion units (only three of these propulsion units, 4, 6 and 7, can be seen in these figures) by means of which the vehicle moves in a longitudinal direction X. FIG. 3 shows that each propulsion unit is provided to this end with a centrally guided track 12 which is driven by a drive sprocket wheel 14 and supported by an idler sprocket wheel 16 and by rollers 18. Two intermediate diameter idler wheels 15 and 17 change the direction of the track at the upper corners of the closed loop that it forms. The body 2 carries in its lower part electrical batteries whose great weight and low position contribute to the stability of the vehicle.

The upper part 3 of the body 2 is wider than the lower part in a transverse direction Y. It carries various units some of which are relatively light, including signal processing means 10, communication means, power electronic devices and sensors and an inertial system (not shown). This upper part also carries a remote manipulator arm 5. The arrow Z represents the vertical direction of the vehicle.

The transverse overall dimension of the upper body is equal to that of the lower body plus the propulsion units, in order to provide sufficient volume without increasing the transverse overall dimension of the vehicle.

A general description will now be given of various advantageous features of the vehicle.

Each of the propulsion units includes, in the conventional manner:

a propulsion unit body 26 supporting the various component parts of the propulsion unit, a ground bearing system 12, 14, 16 supporting the propulsion unit body and having a ground bearing area 19 which extends along the longitudinal direction X and to both ends of which a ground bearing point of the system can move (the system comprises the track 12, the sprocket wheels 14 and 16 and the rollers 18, its ground bearing area 15 extending from the sprocket wheel 14 to the sprocket wheel 16), a drive motor 28 driving the ground bearing system to propel the propulsion unit body 26, a propulsion unit coupling structure 20 coupling the propulsion unit body 26 to the vehicle body 2 so as to support the latter while enabling the propulsion unit body to tilt relative to the vehicle body by rotation about a tilt axis 24 parallel to the transverse direction Y, which tilting movement displaces the ground bearing point, a tilt motor 22 which bears on the coupling structure 20 to drive the tilting movement of the propulsion unit body 26, and force sensors 20B supplying signals representative of the forces applied to the propulsion unit 4 by the ground.

The force signals obtained in this way are transmitted to the signal processing means 10 by conventional means (not shown).

In accordance with the present invention, the coupling structure 20 of each propulsion units 4 to 7 includes:

an attachment part 20A attached to the vehicle body 2, e.g., through a suspension system (not shown), a support part 20C supporting the propulsion unit body 26 through ball bearings 30 to enable the tilting movement, the support part providing a bearing to enable the tilt motor 22 to drive these movements, and a measurement part 20B coupling the attachment and support parts and incorporating several of the force sensors.

The coupling structure is in the form of a generally tubular propulsion unit hub 20. The hub has an axis on the tilt axis 24 and extends transversely from the vehicle body 2 towards the exterior of the vehicle. It enters the propulsion unit where it ends at its support part 20C.

The support part 20C carries a transversely outermost end 32A of a rigid external hub 32 which extends from this end to a transversely innermost end 32B, surrounding the measurement hub 20 coaxially. The external hub 32 carries on its external surface bearings 30 which support the propulsion unit body 26.

The drive motor 28 is at least partially accommodated in the interior of the propulsion unit hub 20 and is fixed to the support part 20C of this hub. The motor drives a gear 28C which rotates about the tilt axis 24 and is situated, in said transverse direction Y, beyond a transversely outermost end 20C of the hub.

The drive motor 28 has a mechanical part in the form of a speed reducer 28B carried by the support part 20C of the hub 20 of the propulsion unit 4 and an electromechanical part. The latter is in the form of an electric motor 28A carried by the speed reducer 28B and situated in a housing 36 formed in the vehicle body 2 in line with the propulsion unit hub 20.

The support part 20C of the propulsion unit hub 20 carries at least one sector of a tilt marker ring 38, the propulsion unit body 26 carrying a tilt sensor 40 which cooperates with the tilt marker ring to supply to the signal processing means 10 a tilt signal representative of the tilt angle of the propulsion unit 4.

The measurement part 20B of the coupling structure 20 includes at least one vertical force sensor measuring the force FZ applied to the structure in a vertical direction Z of the vehicle body, a longitudinal force sensor measuring the force FX applied to this structure in the longitudinal direction X and a transverse torque sensor measuring the moment MY of a pair of forces applied to this structure about the tilt axis Y. In more detail, the measurement part is constituted by a known type "6 - component" sensor which additionally measures the transverse force FY and the moments MX and MZ of the torques applied about longitudinal and vertical axes so that the three components of the general resultant force are measured as are the three components of the moment resulting from all the forces which are applied to the propulsion unit by the vehicle body 2.

The drive sprocket wheel 28C and a chain 44 drive a group of intermediate sprocket wheels 46 which, through a chain 48, drive the drive sprocket wheel 14. These chains can be seen in FIGS. 3 and 8 in particular.

Figure 5:
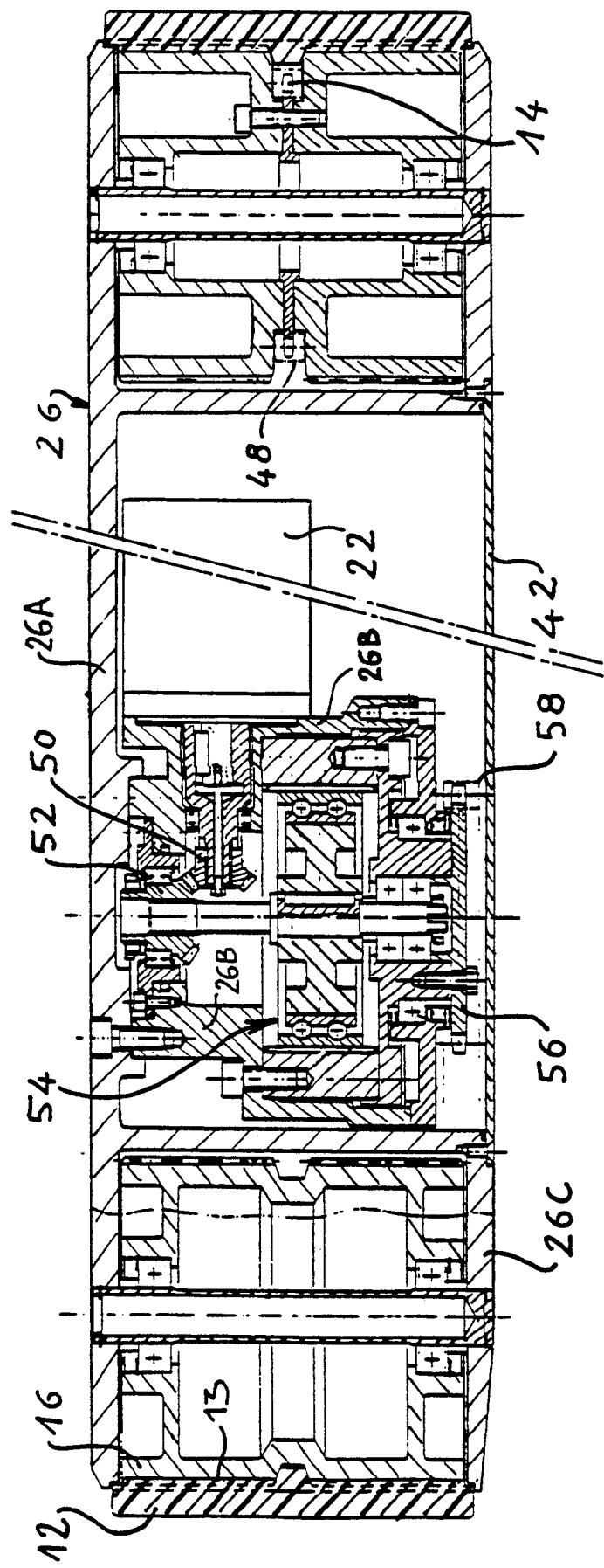
Figure 6:
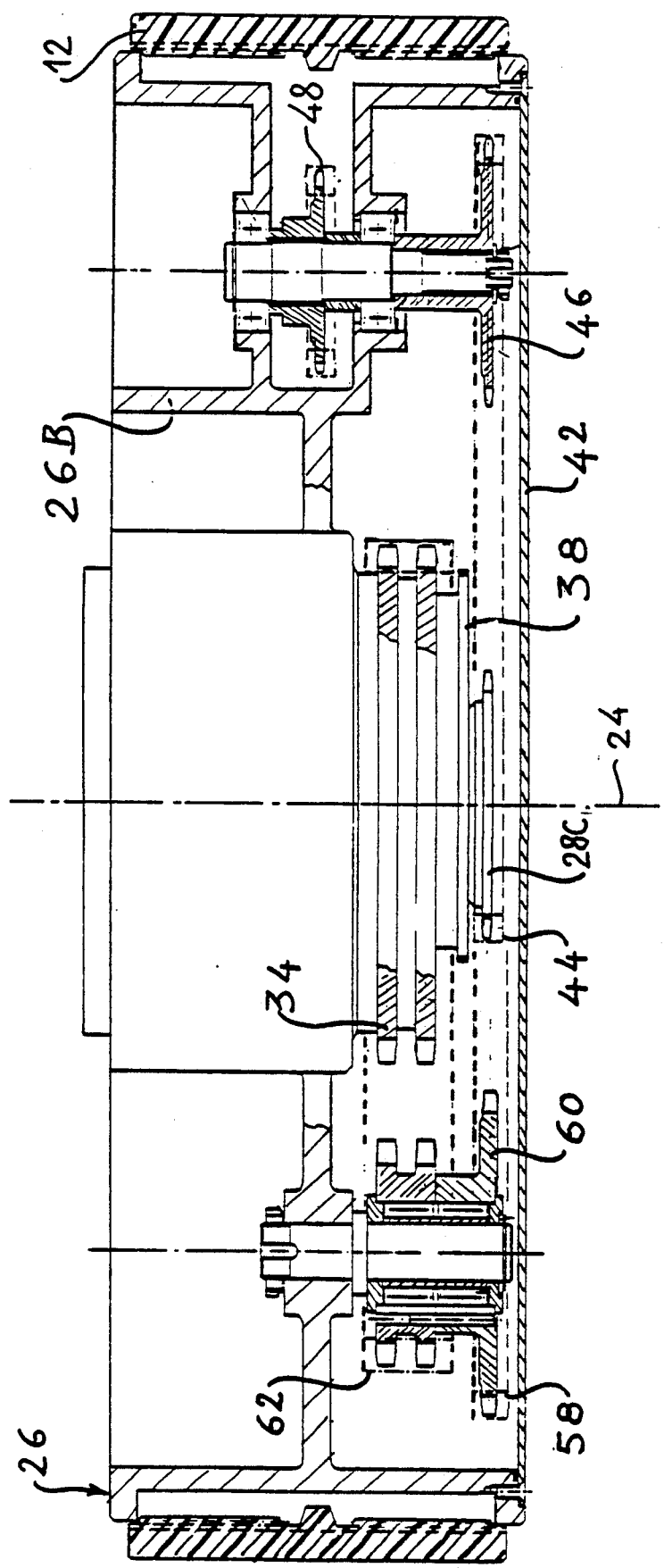
Figure 7:
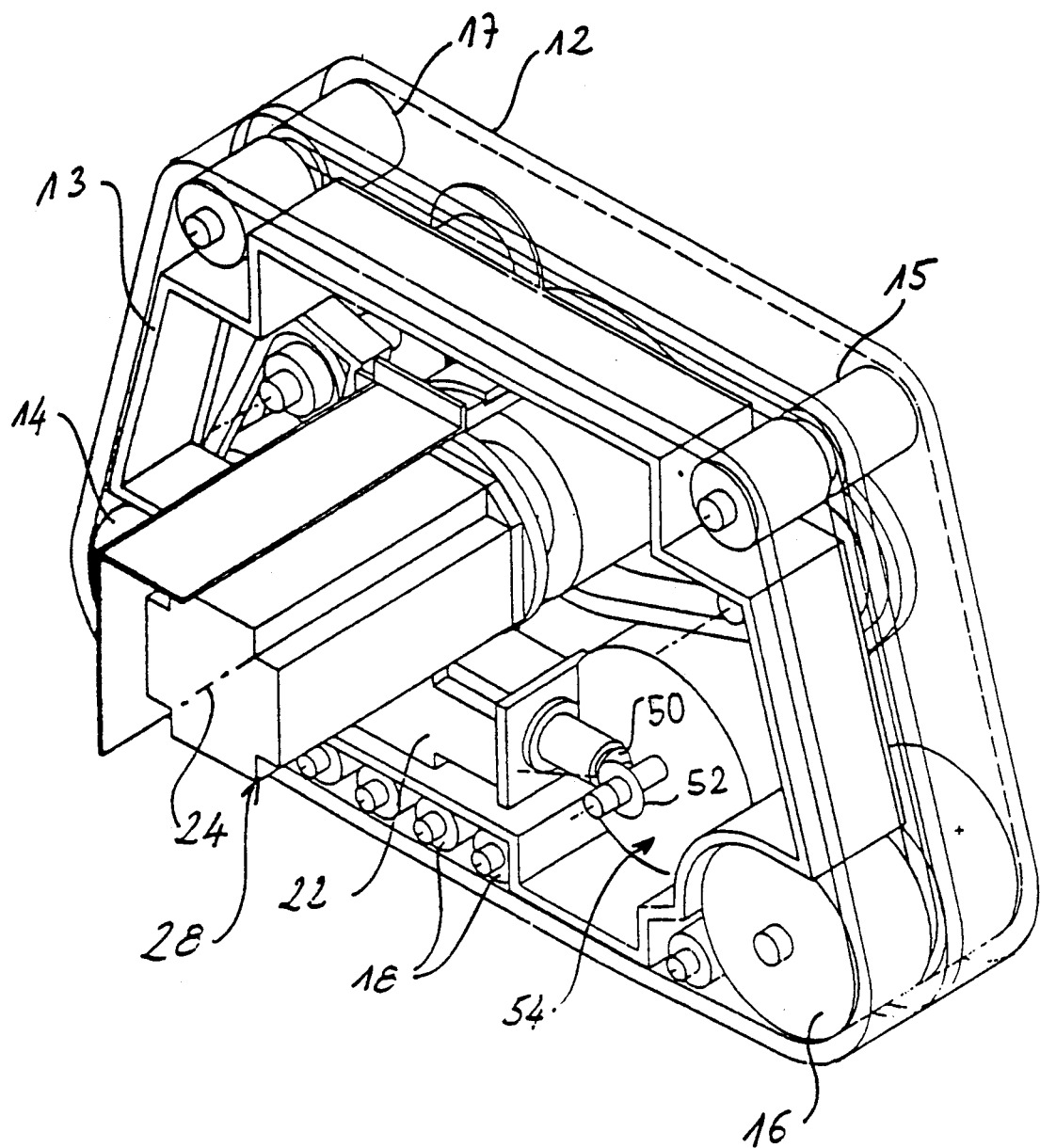
FIGS. 7 and 8 are perspective views of the propulsion unit after the exterior walls have been removed.
Figure 8:
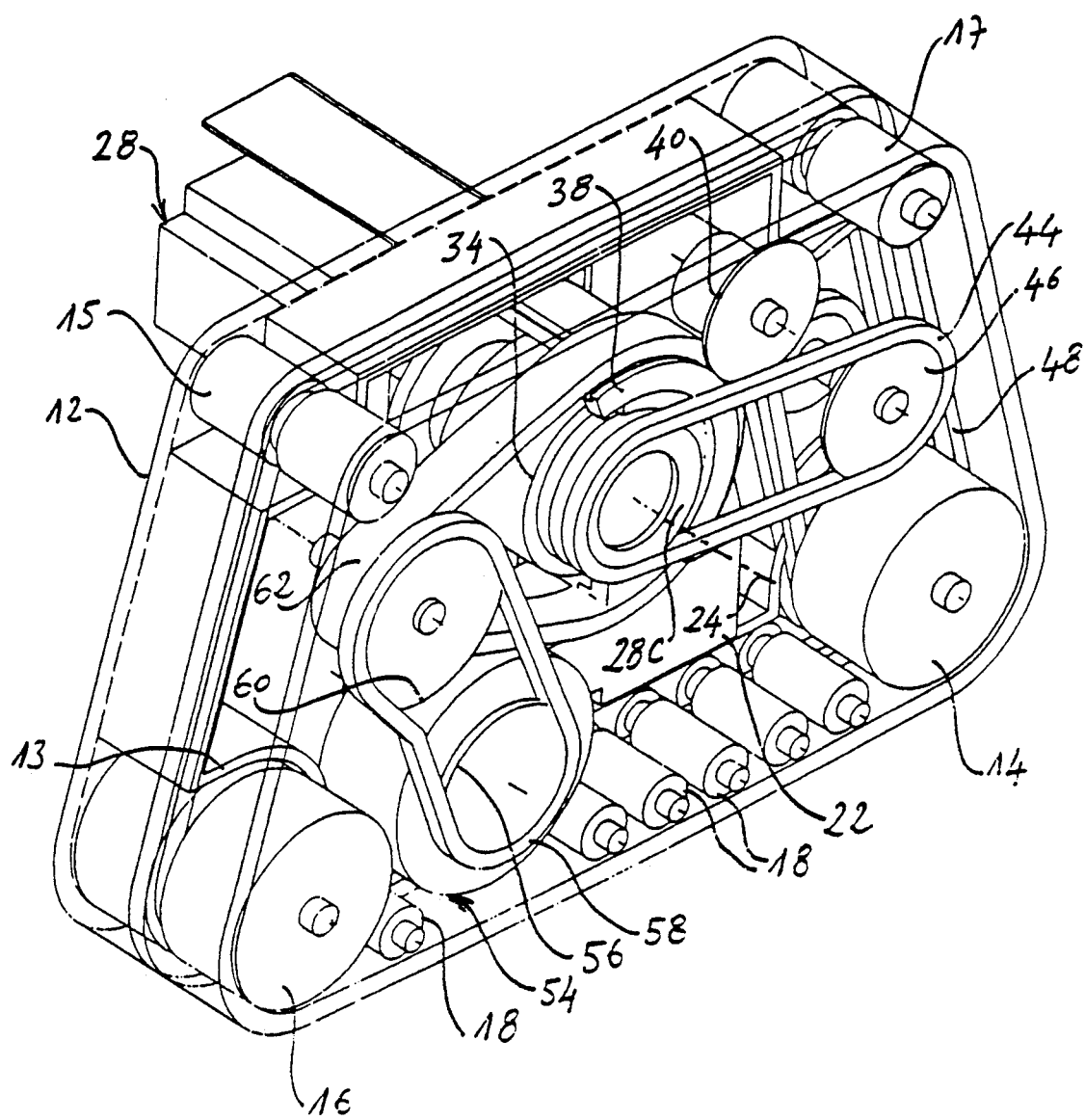

Referring to FIGS. 5 and 7, the tilt motor 22 drives a speed reducer 54 through a pair of right-angle gears 50 and 52. The speed reducer 54 drives a sprocket wheel 56. By means of a chain 58 the sprocket wheel 56 drives a group of intermediate sprocket wheels 60 which drive a chain 62. The sprocket wheels 14 and 16 and the sprocket wheels and gears 46, 50, 52, 56 and 60 are mounted on bearings carried by supports 26B, etc. in the form of transversely outwardly projecting parts on the rigid inside flank 26A of the propulsion unit body 26. The chains 44, 48, 58 and 62 are provided with tensioning rollers which deflect the chains as shown, although they are not shown themselves. As shown in FIG. 8 in particular, the chain 62 bears on a tilt bearing toothed sector 34 to drive the tilt movement of the propulsion unit.

The propulsion unit body 22 is of welded or cast construction in light alloy and its width in the transverse direction Y is equal to that of the track 12. It forms an internal flank 26A, an external flank 26C and a closed-loop strip 13 fastening together these two flanks. An opening in the external flank is covered by an exterior cover 42. The track 12 runs around this frame in contact with the strip 13, which carries an anti-friction coating which is also applied to notches on the inside of the track 12 enabling it to be driven by the sprocket wheel 14.

The propulsion unit which has just been described in part has the following complementary advantages and characteristics:

The six-component sensor constituting the measurement part 20B enables all forces exerted on the propulsion unit 4 to be referred to a single point. Because of this sensor and the corresponding sensors in the other propulsion units, all forces applied to the vehicle in all directions in space are known at all times, so that the vehicle equilibrium conditions are known. The fact that the vehicle is equipped with integrated sensors makes it possible to simplify the design of the vehicle as compared with a vehicle provided with force sensors distributed in numerous different areas of its structure. Data acquisition is therefore virtually instantaneous and data processing time is reduced, whereas in a distributed sensor autonomous guided vehicle data acquisition is very slow because the signals have to be processed by a powerful computer. This is because the sensors have varying efficiencies, depending on their position, which falsify the measurements, cause spreading when the signals are processed and seriously limit the performance of the computer.

The risk of sensor failure is reduced in the case of an integrated sensor as compared with the use of multiple sensors to fulfil the same functions.

The vehicle is simple and easy to manufacture and represents a considerable saving in weight, significantly improving vehicle performance.

The central guiding of the track 12 increases the stability of the vehicle through improved retention eliminating the risk of track-shedding in operation.

Also, the design of the propulsion unit is such that:

its walls form a water-tight enclosure, sealed against splashing of sea water in and, it is rendered explosion-proof by a slight increase in pressure in the modules housing all the electrical and electronic transmission parts of the mechanical assemblies.

We claim:

1. Vehicle comprising a vehicle body (2) having a longitudinal axis (X) and a transverse axis (Y), and propulsion units (4, 6, 7) to support said vehicle body and to propel it in a longitudinal direction, each of said propulsion units (4) comprising (a) a propulsion unit body (26) to support component parts of said propulsion unit;

(b) a ground bearing system (12, 14, 16) supporting said propulsion unit body and having a ground bearing area (14, 16) extending in said longitudinal direction and having two ends to each of which a ground bearing point of said ground bearing system can move;

(c) a drive motor (28) driving said ground bearing system to propel said propulsion unit body;

(d) a propulsion unit coupling structure (20) coupling said propulsion unit body (26) to said vehicle body (2) to support said vehicle body while enabling said propulsion unit body to tilt relative to said vehicle body by rotating about a tilt axis (24) parallel to said transverse direction, which tilting movement displaces said ground bearing point;

(e) a tilt motor (22) adapted to bear on said coupling structure (20) to drive said tilting movement of said propulsion unit body (26);

(f) force sensors (20B) adapted to provide force signals representative of forces applied to said propulsion unit (4);

(g) signal processing means (10) receiving said force signals from all of said propulsion units and commanding actuator devices in such a way as to ensure at least the safety of said vehicle, said actuator devices comprising at least said drive motor (28) and said tilt motor (22) of said propulsion units;

(h) said coupling structure (20) of at least one of said propulsion units (4) comprising an attachment part (20A) attached to said vehicle body (2), a support part (20C) carrying said propulsion unit body (26) by means of bearings (30) to enable said tilting movement, said support part having a tilt bearing toothed sector (34) to enable said tilt motor (22) to drive said movement, and a measurement part (20B) coupling said attachment and support parts and comprising a plurality of said force sensors.

2. Vehicle according to claim 1, wherein said coupling structure is constituted by a propulsion unit hub (20) having an axis on said tilt axis (24) and extending transversely from said vehicle body (2) towards an exterior of said vehicle into a volume of said propulsion unit where it terminates at said support part (20C).

3. Vehicle according to claim 2, wherein said support part (20C) of said propulsion unit hub (20) carries a transversely outermost end (32A) of a rigid external hub (32) which extends from said outermost end to a transversely innermost end (32B) coaxially surrounding said propulsion unit hub, said external hub having an external surface carrying said bearings (30) supporting said propulsion unit body (26).

4. Vehicle according to claim 2, wherein said support part (20C) of said propulsion unit hub (20) carries at least one sector of a tilt marker ring (38), said propulsion unit body (26) carrying a tilt sensor (40) which cooperates with said tilt marker ring to supply to said signal processing means (10) a tilt signal representative of a tilt angle of said propulsion unit (4).

5. Vehicle according to claim 1, wherein at least some of said propulsion units (4, 6, 7) are removable and preferably interchangeable, said attachment part (20A) of said coupling structure (20) of each removable propulsion unit being removably mounted on said vehicle body (2).

6. Vehicle according to claim 1, wherein said measurement part (20B) of said coupling structure (20) includes at least one vertical force sensor measuring a force applied to said structure in a vertical direction (Z) of said vehicle body, a longitudinal force sensor measuring a force applied to said structure in said longitudinal direction (X) and a transverse torque sensor measuring a moment of a torque applied to said structure about said tilt axis (Y).

* * * * *